United States Patent [19]

Johnson

[11] Patent Number: 4,717,165

[45] Date of Patent: Jan. 5, 1988

[54] BOAT TRAILER

[76] Inventor: Lawrence N. Johnson, W. 130 Highdrive, Spokane, Wash. 99203

[21] Appl. No.: 888,757

[22] Filed: Jul. 22, 1986

[51] Int. Cl.$^4$ ................................................ B60P 3/10
[52] U.S. Cl. .................... 280/414.1; 403/113; 414/534
[58] Field of Search ............... 280/414.1, 145, 656, 280/789, 795, 796, 797, 798; 403/113, 117, 119, 146, 164; 414/529, 532, 533, 534

[56] References Cited

U.S. PATENT DOCUMENTS

| | | | |
|---|---|---|---|
| 3,756,439 | 9/1973 | Johnson | 280/414.1 X |
| 3,785,677 | 1/1974 | Calkins | 280/414.1 |
| 3,917,087 | 11/1975 | Godbersen | 414/534 |
| 4,278,388 | 7/1981 | Johnson | 280/414.1 X |
| 4,464,092 | 8/1984 | Chambers et al. | 280/414.1 X |
| 4,530,634 | 7/1985 | Johnson | 280/414.1 X |
| 4,560,316 | 12/1985 | Daniels | 280/414.1 X |

Primary Examiner—John J. Love
Assistant Examiner—Charles R. Watts
Attorney, Agent, or Firm—August E. Roehrig, Jr.

[57] ABSTRACT

A boat trailer having the parallel boat supporting portions of the trailer frame free of any fixed cross frame members rigidly connected to the trailer side booms. The parallel spacing between this portion of the trailer frame is effected by a downwardly curved cross bar member pivotally connected at each end to the trailer side frames. The ends of the pivotally connected cross bar are supported from the trailer side frames in a manner which eliminates the necessity of any side frame-to-cross bar mounting bracketry, thereby improving the aesthetic appearance of the trailer and simulating a welded connection.

9 Claims, 10 Drawing Figures

BOAT TRAILER

BACKGROUND OF THE INVENTION

This invention relates in general to boat trailers and, in particular, to a boat trailer havng an improved frame design which permits a boat to be carried on the trailer in a lower position to improve stability during trailering, and having a unique pivotal boat-hull-supporting cross bar mounting which eliminates the necessity for fixed or rigidly interconnected cross frame members while providing a smooth and uncluttered appearance as if the pivotal cross members were welded to the trailer side frames.

More specifically, but without restriction to the particular embodiment described and illustrated in the drawings, this invention relates to a boat trailer having a pivotal roller-supporting cross bar mounting structure which eliminates the necessity of fixed or rigidly interconnected cross frame members for spacing the trailer side frame members, thereby allowing a boat to be carried lower on the trailer, while providing an aesthetically pleasing appearance by eliminating the necessity of cross bar mounting brackets and U-bolt connectors so that the pivotal cross bar has a smooth appearance as if welded to the trailer side frames.

As the recreational sport of trailer boating has become ever increasingly popular, the designs of boat trailers used for storing and launching boats have improved. The boater is provided with a trailer which is convenient to use and reliable to operate, while fulfilling its primary function of properly supporting the boat hull both during storage and transport over the roadway. To this end, the present inventor, L. N. Johnson, invented the roller trailer described in U.S. Pat. No. 3,155,249 which provided a unique boat hull support system utlizing a plurality of rollers. Further improvements in such trailer construction are described in L. N. Johnson, U.S. Pat. Nos. 4,530,634 and 4,592,694. These latter two patents relate to a boat trailer construction which eliminates the necessity for any cross frame members fixed or rigidly interconnected between the parallel boat supporting portion of the trailer, which before these inventions had been required in boat trailer construction.

While each of these designs has improved boat trailer construction, as improved boat trailers were offered to the trailer boater additional features have become desirable. One of these features is to lower the position of the boat relative to the trailer frame to improve trailerability and appearance. Another desirable feature is a "custom" appearance, which improves the aesthetics of a boat and trailer package by giving the appearance that the trailer has been designed for the particular boat which is carried on the trailer.

Heretofore custom trailers have been fabricated by proper positioning of the various trailer components for a particular boat design, welding these components into the proper position and providing a color trim that matches or complements the boat. The overall appearance thus created is a smooth flowing design of a trailer designed for a particular type of boat, and color trimmed for an individual boat of that type. Large scale manufacturing of such trailers, however, has been prohibitive because of the wide range of boat hull designs. In order to provide a boat trailer at a competitive price, the trailer was required to be sufficiently adjustable to be used with a range of boat sizes and hull designs. Accordingly, components of the trailer had to be adjustable, requiring the use of U-bolts and adjustable brackets to provide sufficient accommodation for these variables.

SUMMARY OF THE INVENTION

It is, therefore, an object of the present invention to improve boat trailers both functionally and aesthetically.

It is another object of this invention to eliminate the necessity for any interconnected cross frame members rigidly or fixedly connected between the parallel boat supporting portions of the trailer side frames or booms, through the use of an improved pivot connection.

Another object of this invention is to extend the parallel boat supporting length of the trailer side booms, in combination with a downwardly curved cross bar member pivotally supported between the parallel portion of the trailer side frame members, to obtain a lower positioning of a boat carried on the trailer.

Still another object of this invention is to mount the pivotal boat supporting cross bar members on the parallel portion of the trailer side frames in a manner which eliminates the necessity for boom-to-cross bar supporting brackets, thereby giving the smooth and aesthetically pleasing appearance of a welded connection between the ends of the pivotal cross bar and the trailer side frame members.

Yet another object of this invention is to provide a trailer having the appearance of an all welded custom trailer, but having the boat hull supporting cross bar members pivotal relative to the trailer side frame.

These and other objects are attained in accordance with the present invention wherein there is provided a boat trailer having the parallel boat supporting portions of the trailer frame free of any fixed cross frame members rigidly connected to the trailer side booms. The parallel spacing between this portion of the trailer frame is effected by a downwardly curved cross bar member pivotally connected at each end to the trailer side frames. The ends of the pivotally connected cross bar are supported from the trailer side frames in a manner which eliminates the necessity of any side frame-to-cross bar mounting bracketry, thereby improving the aesthetic appearance of the trailer and simulating a welded connection.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 8 is an enlarged view of a portion of the trailer to better illustrate the manner in which the boom-to-tongue cross member is constructed;

FIG. 9 is a top view of the structure of FIG. 8 taken along line 8—8; and

DESCRIPTION OF A PREFERRED EMBODIMENT

Figure 1:
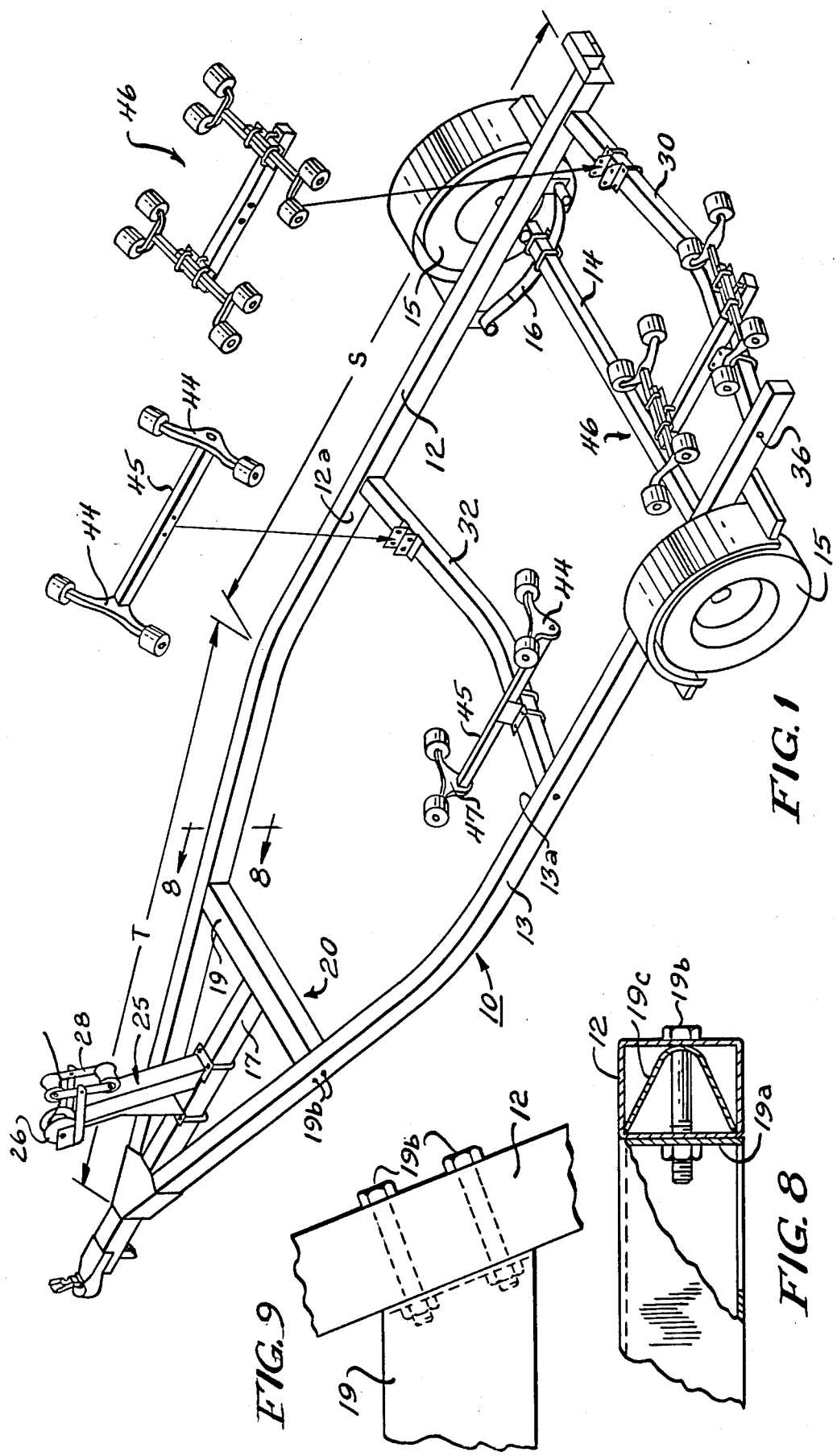
FIG. 1 is a top perspective view of a boat trailer constructed in accordance with the invention.

Referring now to the drawings, the boat trailer 10 includes two laterally spaced side frame or boom members 12 and 13 with each of the side frame members being supported for movement over a roadway by a pair of wheels 15 secured to an axle 14 which is connected to the side booms by a pair of leaf-springs 16 in a manner known to those skilled in the art. While a single axle trailer is illustrated, a tandem axle configuration may also be used depending upon the weight of the boat to be carried on the trailer. In such a configuration the tandem axles are positioned parallel to each other and extend transversely between the two side booms.

The forward ends of the longitudinally extending side frame members 12 and 13 converge toward each other forming a tongue portion T. The terminal end of the tongue portion is connected to a tongue-to-boom yoke 20 comprising a T-shaped member. The cross bar 19 of the yoke 20 is connected to a stem portion 17 by a U-shaped bracket (not shown) which is welded to the center of the front face of the cross bar and extends into an open end of the stem 17 to which it is secured as by a bolt passing through the stem 17 and bracket. As best shown in FIGS. 8 and 9, the ends of the Tee cross bar 19 are closed by a plate 19a and joined to the tongue forming portion of the side frame members 12 and 13 at each end by a pair of bolts 19b passing through the side frame members and plates. The front end of the side frame members 12 and 13 are also bolted to the stem 17. The bottom portion of each end of the cross bar 19 is open to provide access to assemble its bolt connection with the side members. A V-shaped strengthening plate 19c is carried within each side boom member 12 and 13 and positioned at the connection with the cross bar 19 to reinforce each boom member to prevent distortion upon tightening the connection.

Figure 2:
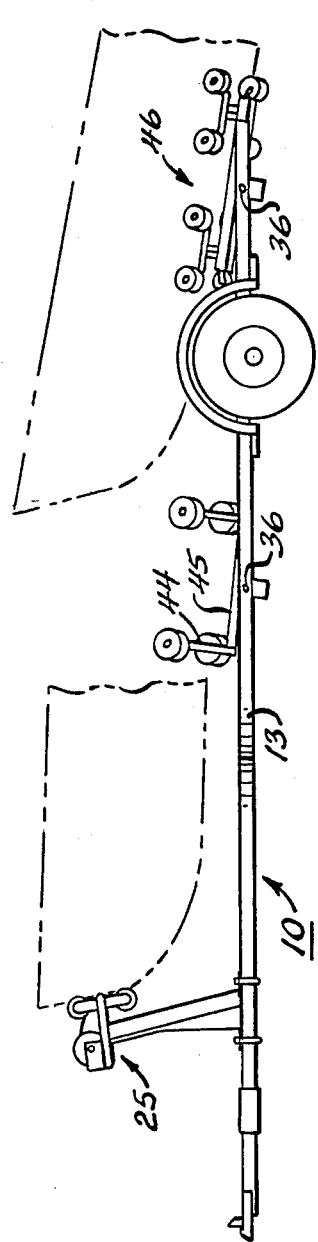
FIG. 2 is a side elevation of a boat trailer such as shown in FIG. 1.

A winch stand 25, best shown in FIGS. 1 and 2, is carried on the stem 17 of the Tee bar and is adjustable fore and aft. The upper end supports a winch 26 and bow-engaging roller stop 28. These components, as known to those skilled in the art, are used for drawing a boat onto the trailer and securing it in position.

Figure 3:
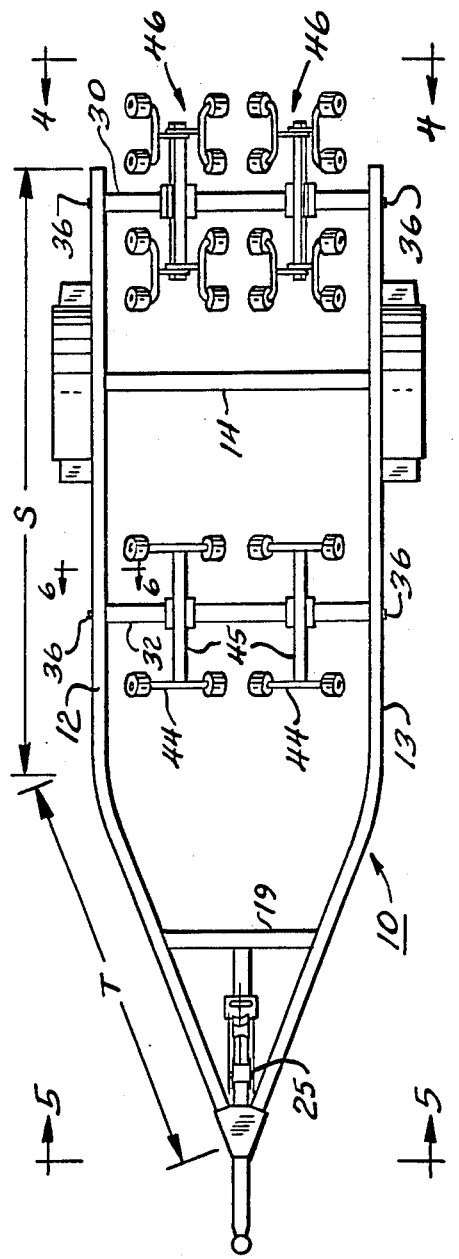
FIG. 3 is a plan view of the boat trailer shown in FIG. 2.
Figure 4:
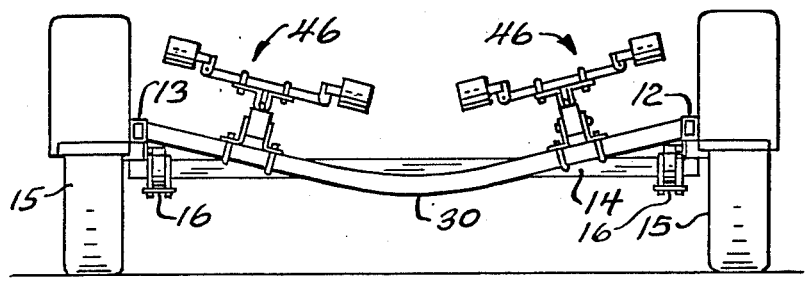
FIG. 4 is a rear elevational view of the trailer illustrated in FIG. 3 taken along the lines 4—4.

The rear portion of the trailer side frame members 12 and 13 are positioned in spaced parallel relationship to each other, as best shown in FIGS. 1, 3 and 4 to form a boat-supporting portion 5 for carrying a boat on the trailer. The parallel boat-supporting portion is maintained in a spaced parallel position by one or more cross bar members 30 and 32 which are each pivotally connected at each end to the adjacent side boom or side frame member 12 and 13. Although not intended to be so limited, for convenience of illustration the boat trailer 10 is described with a single axle 14 and a pair of pivotal cross members 30 and 32 with one of the cross members 32 being positioned fore and the other cross member 30 being positioned aft of the trailer axle 14. However, it is to be understood that a single cross bar member may be utilized for a smaller trailer having a lesser weight capacity, or a multiple axle configuration may be used having a plurality of pivotal cross bars when a greater weight capacity is necessary.

Since the pivotal cross bars 30 and 32 are mounted to the side boom members 12 and 13 in an identical manner, only one of the cross bars and its connection will be described in detail. As best shown in FIGS. 1, 4, 6 and 7, the cross bar 32 is curved in a downward direction relative to the roadway surface and carries thereon a plurality of boat-supporting rollers. These rollers are mounted on pivot arms 44 secured to a tube member 45 with the rollers being carried both fore and aft of the cross bar 32. For further details of the construction of a suitable roller support reference is had to copending application Ser. No. 858,699, filed in the name of L. N. Johnson on May 2, 1986, the disclosure of which is incorporated herein by reference. Depending upon the weight capacity of the trailer other roller configurations may be utilized, for example, as illustrated by the rollers 46 best shown in FIGS. 1–4.

Figure 6:
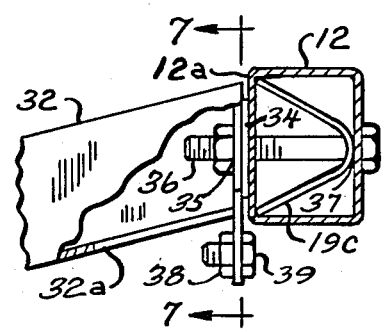
FIG. 6 is an enlarged cross sectional view of a portion of the trailer taken along line 6—6 of FIG. 3, to better illustrate the manner in which the pivotal cross bar members are connected to the trailer side frame.
Figure 5:
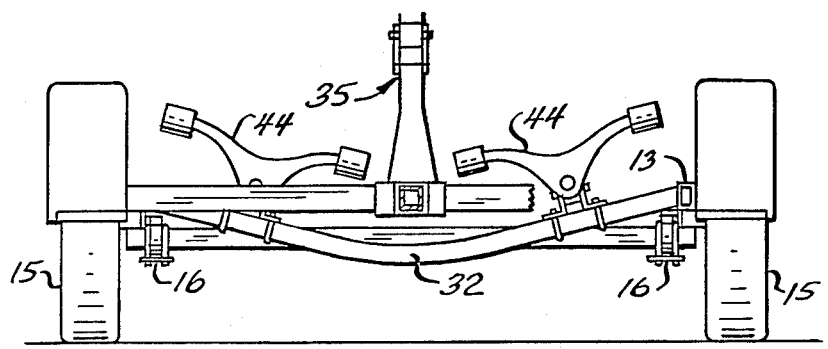
FIG. 5 is a front elevational of the trailer illustrated in FIG. 3 taken along the lines 5—5.
Figure 7:
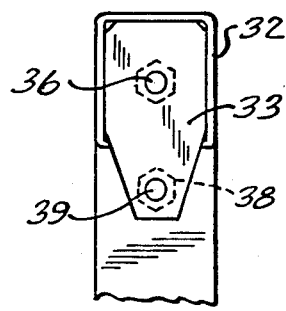
FIG. 7 is an end view of the structure illustrated in FIG. 6 taken along line 7—7.

The ends of the cross bar 32 are open and have positioned therein a closure plate 33 which is welded within the open end of the cross bar member to form an end plate on each end thereof. The cross bar 32 is then positioned adjacent to the inner walls 12a and 13a of the side boom members 12 and 13 with a washer 34 positioned therebetween. The end plate 33 is formed with a pivot hole 35 therein for receiving a pivot bolt 36 about which the cross member 32 will pivot relative to the side booms 12 and 13. To this end a hole 37 is formed through each of the side booms 12 and 13, and the pivot bolt 36 extends through each of the side boom members and the end plate 33 to be secured in position by a lock washer and nut as best illustrated in FIGS. 6 and 7. To provide ready access for assembling such a pivotal connection, a portion 32a on the bottom of each end of the cross members is removed to provide ready access for securing the pivotal connection.

As best shown in FIGS. 6 and 7, the end plate 33 is formed with a lower extending portion having another hole 38 formed therein to receive a stop bolt 39. This enables the end plate 33 to also function as a stop member for limiting the pivotal movement of the cross member 32 in both a fore and aft direction. It has also been found preferable to provide a V-shaped or reinforcing plate 19c within each of the side boom members 12 and 13 in the manner previously described with reference to the tongue-to-frame cross bar 19 to prevent distortion of these side frame members and more evenly distribute the force applied thereto through the weight of a boat on the pivotal cross bar 32.

Figure 10:
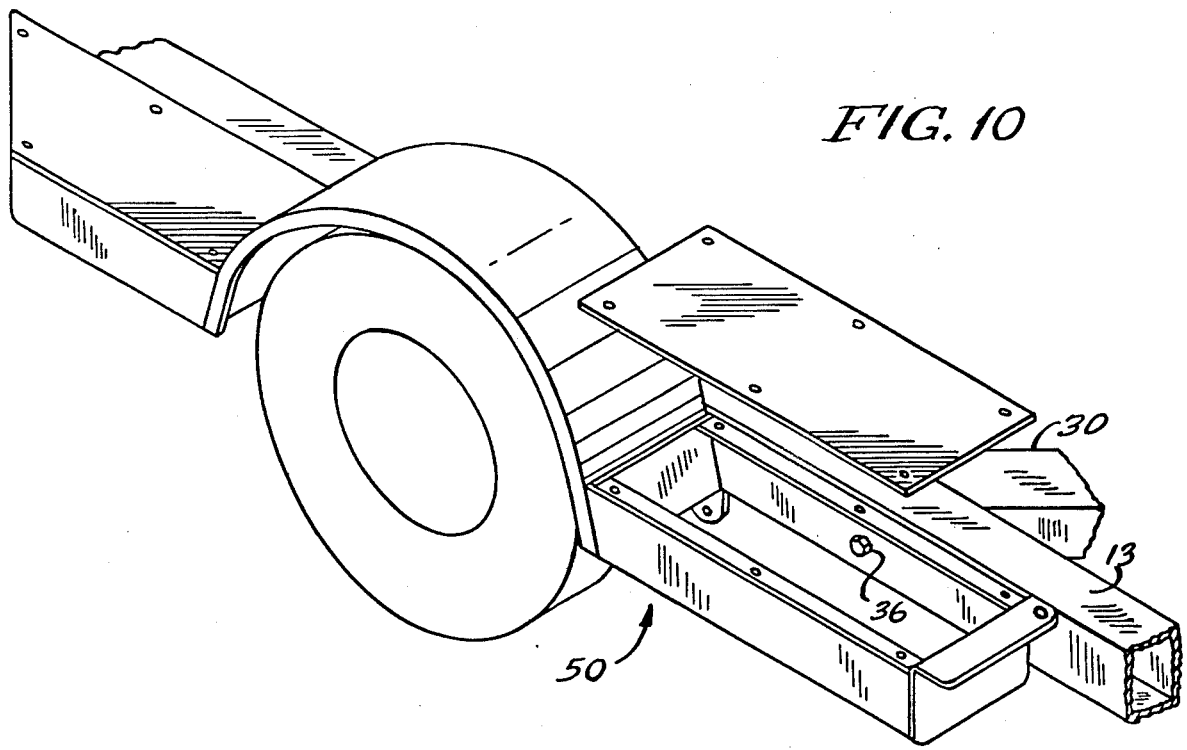
FIG. 10 is an enlarged view of a portion of the trailer to illustrate an optional component which functions as a step and improves the custom-like appearance of the trailer.

With the cross bar members 30 and 32 mounted in this manner, the ends of the pivotal cross bars are in close proximity with the inner surfaces 12a and 13a of the parallel boat-supporting portions of the trailer side boom members 12 and 13. This provides an aesthetic appearance as if the pivotal cross bar members 30 and 32 are welded to the inner surface of the side booms, and eliminates any necessity for a side boom-to-cross member coupling bracket as heretofore required. When an optional step 50 is provided, as illustrated in FIG. 10, the step 50 is secured to each of the trailer side booms 12 and 13, and the trailer fender so that even the end of the pivot bolt 36 does not show. In this manner, the lines of the trailer are improved giving a smooth uncutted appearance, eliminating any ungainly and unattractive appearance of hanging brackets and U-bolt connectors.

Since the parallel boat-supporting portions of the trailer extends an increased length exceeding the length of the forward tongue forming portion T, the pivotal cross bar members 30 and 32 may be spaced one on each side of the axle 14 throughout the boat-supporting lengths at any position in accordance with weight distribution of the boat to be carried on the trailer. This increased length of the boat-supporting portion permits the cross bar members to be positioned such that a boat carried thereupon is positioned lower on the trailer improving trailering characteristics.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawings an described in the specification as the best mode presently contemplated for carrying out this invention, but that the invention will include any embodiments falling within the description of the appended claims.

I claim:

1. In a boat trailer comprising two elongated side frame members positioned adjacent to each other and supported on a spring-connected wheel bearing axle for movement over a roadway surface, said trailer having a cross bar member extending transversely between the two side frame members and pivotally connected thereto for facilitating movement of a boat on to and off from the trailer, and said pivotally connected cross bar member carrying boat-hull-engaging support means, the improvement comprising:
   an end plate connected to each end of the cross bar member and having a hole formed therein for receiving a pivot bolt therethrough to extend within the adjacent end of the cross bar member,
   a pivot bolt receiving hole formed in each of said side frame members at a position adjacent to the hole formed in the end plates of the cross bar member for receiving a pivot bolt therethrough, and
   a pivot bolt extending within the end of the cross bar member and through said hole formed in each of said end plates and said adjacent pivot bolt receiving hole formed in said side frame members for forming a pivotal connection between the cross bar member and the trailer side frame members.

2. The apparatus of claim 1 wherein said end plate includes a stop portion extending downwardly from the end of the cross bar member and having stop means connected thereto for engaging said side frame member to limit the pivotal movement between the cross bar member and the side frame members.

3. The apparatus of claim 1 further including a washer carried on said pivot bolt and positioned between an outer face of said end plate and an inner face of said side frame members.

4. The apparatus of claim 1 wherein said cross bar member is curved in a downward direction relative to the roadway surface over which the trailer is movable.

5. The apparatus of claim 1 wherein each trailer side frame member has at least two sides parallel and said pivot bolt extends through both of said parallel sides of said side frame member.

6. The apparatus of claim 1 further including
   reinforcing means carried within each of said side frame members for engagement therewith to strengthen pivot connection,
   said reinforcing means having a pivot bolt receiving hole formed therein, and
   said pivot bolt extending through said reinforcing means to distribute the loading forces applied through said cross bar member.

7. A boat trailer comprising
   two elongated side frame members positioned adjacent to each other and supported on a spring-connected wheel bearing axle for movement over a roadway surface,
   each one of said side frame members having a forward tongue forming portion converging toward the other one of said side frame members for connection to a towing vehicle and a rear boat-supporting portion extending parallel to the other one of said side frame members for supporting a boat thereupon,
   said parallel extending boat-supporting portions of said side frame members defining an area therebetween throughout the parallel extending length thereof which is free of any cross frame members rigidly connected between the boat-supporting portion of one of said side frame members and the boat-supporting portion of the other one of said side frame members,
   at least one boat-supporting cross member extending between and pivotally connected to said parallel boat-supporting portions of each of said side frame members for fore and aft pivotal movement relative thereto for supporting a boat placed on the boat trailer and effecting the parallel spacing between said boat-supporting portions of said side frame members,
   each end of said boat-supporting cross member having an end plate secured thereto with a pivot bolt receiving hole formed therethrough for receiving a pivot bolt therethrough to extend within the adjacent end of the cross bar member,
   each of said side frame members having a pivot bolt receiving hole formed therein at a position adjacent to the hole formed in said cross member end plate,
   a pivot bolt extending within the end of the cross bar member and through each of said pivot bolt receiving holes formed in said side frame member and the adjacent hole formed in said cross member end plate to form the pivotal connection between said cross member and said side frame members, and
   boat-hull engaging support means carried by said boat-supporting cross member for pivotal movement therewith relative to said elongated side frame members to facilitate loading and launching a boat.

8. The boat trailer of claim 7 further including at least one other boat-supporting cross member pivotally connected to said parallel boat-supporting portions of each of said side frame members for fore and aft pivotal movement relative thereto and extending transversely between to support a boat on the trailer and to laterally space said parallel boat-supporting portions of said side frame members, said pivotally connected boat-supporting cross members being positioned parallel to and on either side of said wheel bearing axle for defining an area between said pivotally connected boat-supporting cross members throughout the length of said parallel boat-supporting portions of said side frame members between said pivotally connected boat-supporting cross members which is free from any cross frame members rigidly connected between the boat-supporting portion of one of said side frame members and the boat-supporting portion of the other one of said frame members, each end of both of said boat-supporting cross members having an end plate secured thereto with a pivot bolt receiving hole formed therethrough to receive a pivot therethrough to extend within the adjacent end of the cross bar member, each of said side frame members having pivot bolt receiving holes formed therein at a position adjacent to the hole formed in said cross members end plate, a pivot bolt extending within the end of the cross bar member and through each of said pivot bolt receiving holes formed in said side frame member and the adjacent hole formed in said cross members end plate to form the pivotal connection between said cross members and said side frame members.

9. A boat trailer including a frame structure comprising two elongated side frame members positioned in spaced relation relative to each other and carried on a spring-connected wheel-bearing axle for movement over a supporting roadway surface, each of said side frame members having a forward end which converges toward the other side frame member to form a vehicle-engageable tongue portion, and a rear end which extends parallel to the other side frame member to form a boat-supporting portion, two boat-supporting cross members having opposite ends pivotally connected to said boat-supporting portions of said side frame members for fore and aft pivotal movement of said boat-supporting cross members relative to said boat-supporting portions of said side frame members to assist in moving a boat on to and off of the trailer, said parallel extending boat-supporting portions of said side frame members which extend between said pivotally connected boat-supporting cross members defining an area throughout the length thereof which is free of any structural members rigidly interconnecting one of said parallel boat-supporting portions of said side frame members with the other, each end of said two boat-supporting cross members having end plates secured thereto with a pivot bolt receiving hole formed therethrough for positioning a pivot bolt therethrough to extend within the adjacent end of the cross bar member, each of said side frame members having a pivot bolt receiving hole formed therein at a position adjacent to the hole formed in said two cross members end plates, a pivot bolt extending within the end of the cross bar member and through each of said pivot bolt receiving holes formed in said side frame member and an adjacent hole formed in one of said two cross members end plates to form the pivotal connection between said cross members and said side frame members, and boat-hull engaging support means supported on said pivotally connected boat-supporting cross members for engaging the hull of a boat and assisting movement of a boat on to and off of the trailer.

* * * * *